United States Patent
Spindel et al.

(10) Patent No.: US 6,550,794 B1
(45) Date of Patent: Apr. 22, 2003

(54) ADAPTATION TO WHEELED CART TO ENABLE PUSHING OF MULTIPLE UNITS

(76) Inventors: Martin Spindel, 501 7th Ave.-18th Flr - 1800 A, New York, NY (US) 10018; Nadine Cino, 501 7th Ave. - 18th Flr - 1800A, New York, NY (US) 10018

( * ) Notice: Subject to any disclaimer, the term of this patent is extended or adjusted under 35 U.S.C. 154(b) by 0 days.

(21) Appl. No.: 09/451,586

(22) Filed: Nov. 30, 1999

(51) Int. Cl.⁷ .................................................. B62B 1/00
(52) U.S. Cl. ............................. 280/79.11; 280/33.993; 280/79.3; 280/408
(58) Field of Search ........................... 280/79.3, 79.11, 280/79.2, 47.14, 47.16, 408, 33.992, 33.998, 33.993, 18, 20, 416.3, 47.34, 414.1, 79.1 R; 24/33 P, 33 M; 213/75 R, 77; 403/364, 334, 339; 446/111, 120, 105; 220/23.4, 23.83

(56) References Cited

U.S. PATENT DOCUMENTS

| | | | | |
|---|---|---|---|---|
| 328,822 A | * | 10/1885 | Spruce | 24/33 P |
| 1,975,862 A | * | 10/1934 | Olsen | 24/33 M |
| 2,691,242 A | * | 10/1954 | Young | 446/115 |
| 2,813,727 A | * | 11/1957 | Whalen | 280/408 |
| 3,131,829 A | * | 5/1964 | Masser | 220/23.4 |
| 3,249,169 A | * | 5/1966 | Cheak | 280/408 |
| 3,338,452 A | * | 8/1967 | Oakley et al. | 220/23.4 |
| 3,429,536 A | * | 2/1969 | Petry et al. | 410/77 |
| 3,462,181 A | * | 8/1969 | Lewis | 403/364 |
| 3,514,001 A | * | 5/1970 | Meritt et al. | 280/79.11 |
| 3,734,526 A | * | 5/1973 | Propst et al. | 280/79.3 |
| 3,799,566 A | * | 3/1974 | Thompson | 280/18 |
| 3,911,826 A | * | 10/1975 | Nilsson | 280/33.992 |
| 3,982,748 A | * | 9/1976 | Hooper et al. | 280/18 |
| 4,060,252 A | * | 11/1977 | Mowery | 280/79.1 R |
| 4,095,913 A | * | 6/1978 | Pettersson et al. | 403/364 |
| 4,286,752 A | * | 9/1981 | Cheng | 280/33.992 |
| 4,770,297 A | * | 9/1988 | Chang | 220/23.4 |
| 4,889,254 A | * | 12/1989 | Vola | 220/23.4 |
| 4,930,753 A | * | 6/1990 | Alvyn | 403/339 |
| 5,050,755 A | * | 9/1991 | Strawder | 220/23.83 |
| 5,137,485 A | * | 8/1992 | Penner | 446/111 |
| 5,263,668 A | * | 11/1993 | Reiter | 248/346 |
| 5,343,812 A | * | 9/1994 | Ishida | 105/4.3 |
| 5,381,916 A | * | 1/1995 | Strawder | 220/23.4 |
| 5,413,236 A | * | 5/1995 | Kenevan | 220/23.4 |
| 5,704,625 A | * | 1/1998 | Presnell et al. | 280/79.2 |
| 5,860,369 A | * | 1/1999 | John et al. | 108/57.26 |
| D407,929 S | * | 4/1999 | Woodring | D6/449 |
| 5,984,566 A | * | 11/1999 | Blaha | 403/364 |
| 6,017,043 A | * | 1/2000 | Bennett et al. | 280/18 |
| 6,095,348 A | * | 8/2000 | Karashima | 280/79.3 |

\* cited by examiner

*Primary Examiner*—Brian L. Johnson
*Assistant Examiner*—Hau Phan
(74) *Attorney, Agent, or Firm*—Pennie & Edmonds LLP

(57) ABSTRACT

The present invention comprises sets of teeth that are spaced apart from each other in a sawtooth configuration and project horizontally outward from the front and rear ends of a hand propelled, wheeled cart. The front teeth of one cart are capable of intermeshing with the opposed rear teeth of another cart. The intermeshing teeth restrict the carts from independent lateral motion, so that when two or more carts are pushed from the rear, all carts stay in alignment with each other. This allows two or more carts to be pushed as one unit, either in a straight line or around turns.

12 Claims, 5 Drawing Sheets

ADAPTATION TO WHEELED CART TO ENABLE PUSHING OF MULTIPLE UNITS

BACKGROUND

The present invention discloses a method of adapting a hand propelled, wheeled cart so that two or more carts can be pushed by one person as a unit. The inventors have submitted two U.S. patent applications (now U.S. Pat. Nos. 6,105,980 and 6,199,879) for another invention which also includes a hand propelled, wheeled cart. However, such applications do not specifically pertain to a means by which two or more carts can be pushed by one person.

INVENTION

Sets of teeth that are spaced apart from each other in a sawtooth configuration and project horizontally outwards from the front and rear ends of a hand propelled, wheeled cart.

SUMMARY OF THE INVENTION

Hand propelled, carts and dollies (collectively referred to as "carts") are typically comprised of a low-lying flat platform atop a set of four wheels. Such carts are commonly used to move freight, goods and other objects and materials. Except for the present invention, one person can usually push only one cart at a time because it is too difficult to control the movement of two or more carts.

The present invention allows one person to push, steer and control the movement of two or more carts simultaneously. The invention consists of sets of teeth that are incorporated into the front and rear ends of a cart. The teeth would typically be made of a strong, hard material, such as metal, plastic, wood or rubber, and can either be an integral component of the cart or separate units that are attached to it. If separate, the attachment can be either permanent or removable.

The teeth project horizontally outwards from the front and rear ends of the carts and are spaced apart from each other in a fork-like or sawtooth configuration. In the preferred embodiment, the front and rear teeth are offset from one another, so that the front teeth of any one cart can be intermeshed with the opposed rear teeth of another cart. When the teeth are intermeshed, two or more carts can be pushed from the rear as one unit. The intermeshing of the teeth prevent the carts from moving out of alignment with each other when being pushed. Such intermeshing teeth can be alternatively described as "interlocking fingers."

The intermeshing is accomplished by simply pushing the front set of teeth of one cart into the rear set of teeth of a cart in front of it. In reverse, two or more carts can be unmeshed, or disengaged, by simply pulling them apart.

The present invention results in a marked increase in efficiency, allowing two or more carts to be pushed at once. Also, the intermeshing and disengaging processes are fast and do not require the person pushing to either bend down or use any type of time consuming, mechanical, coupling device to link the carts together.

In an alternative embodiment of the invention, the front and rear teeth are not offset from each other, but rather the carts themselves can be offset so that the teeth intermesh. Such alternative embodiment is illustrated in FIG. 5.

Other objects and features of the invention will become apparent as the description proceeds, especially when taken in conjunction with the accompanying drawings which illustrate a preferred, and other, embodiments of the invention.

BRIEF DESCRIPTION OF THE DRAWINGS

In FIG. 1A, the carts are unmeshed, or disengaged, and in FIG. 1B they are intermeshed.

DESCRIPTION OF THE PREFERRED EMBODIMENT

Figure 1A:
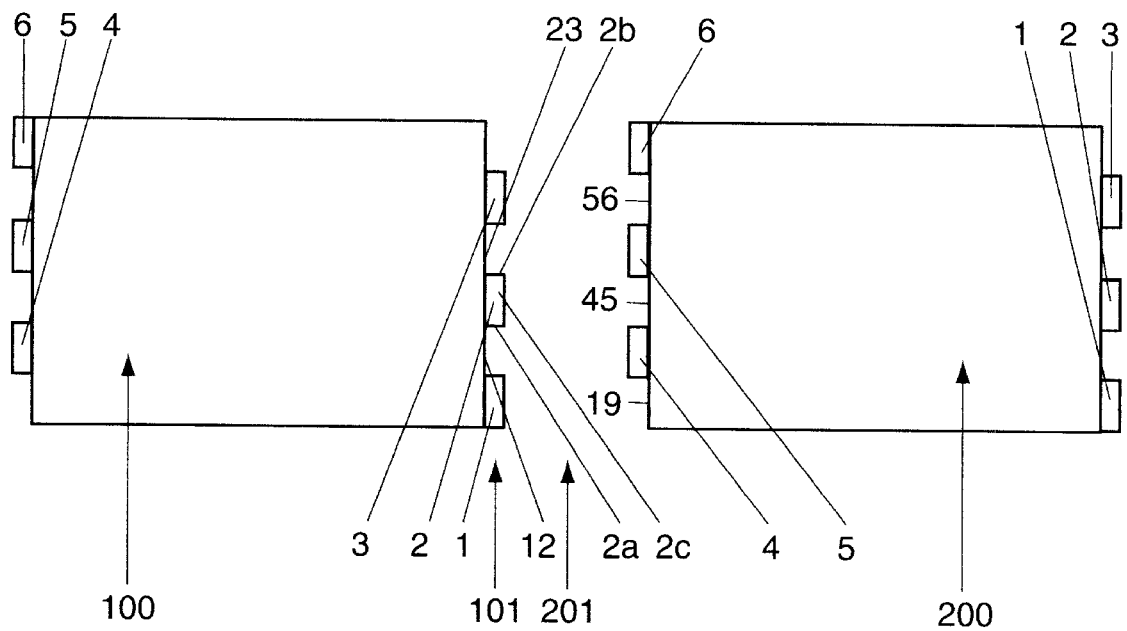
FIGS. 1A and 1B are top views of carts with the sets of teeth that comprise the present invention, such teeth projecting horizontally outwards from the front and rear ends of their respective carts.
Figure 1B:
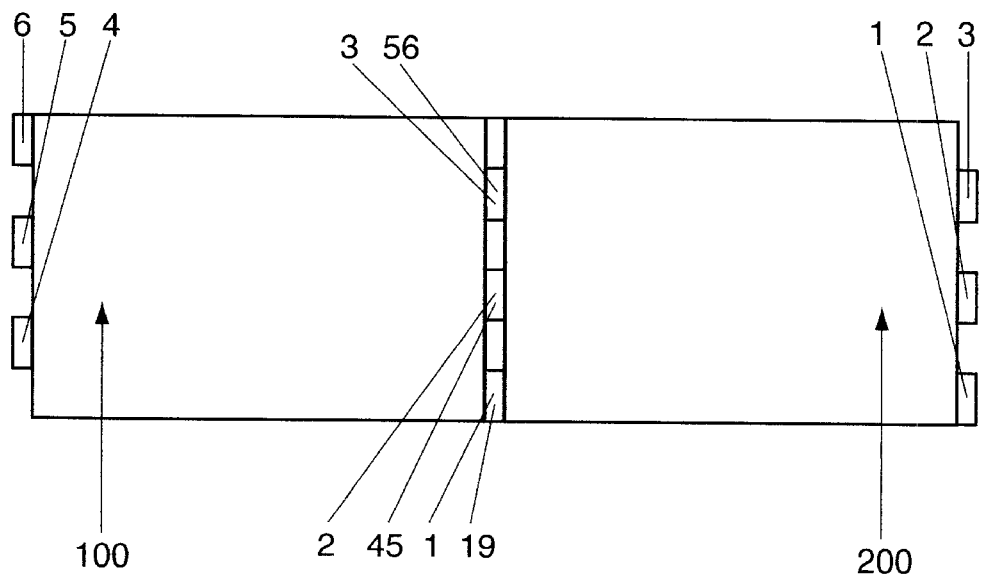

FIGS. 1A and 1B show preferred embodiments of the invention in top view. As shown in FIG. 1A, front set of teeth 101 is comprised of front teeth 1, 2 and 3, which project outwardly from cart 100. Such front teeth are spaced apart from each other in a sawtooth or fork-like construction. Front tooth 2 is comprised of surfaces 2a, 2b and 2c. Surface 2c is the outermost surface and is connected to cart 100 by surfaces 2a and 2b, which are parallel to each other and form right angles with respect to surface 2c. Front teeth 1 and 3 are constructed in the same manner as front tooth 2.

Surface 12 comprises an empty space between front teeth 1 and 2. Surface 23 comprises an empty space between front teeth 2 and 3. The aforementioned "sawtooth construction" is formed by surfaces 12 and 23, comprising empty spaces between front teeth 1, 2 and 3.

As further shown in FIG. 1A, rear set of teeth 201 is comprised of rear teeth 4, 5 and 6, which project outwardly from cart 200. Such rear teeth are spaced apart from each other in a sawtooth or fork-like construction.

Figure 2:
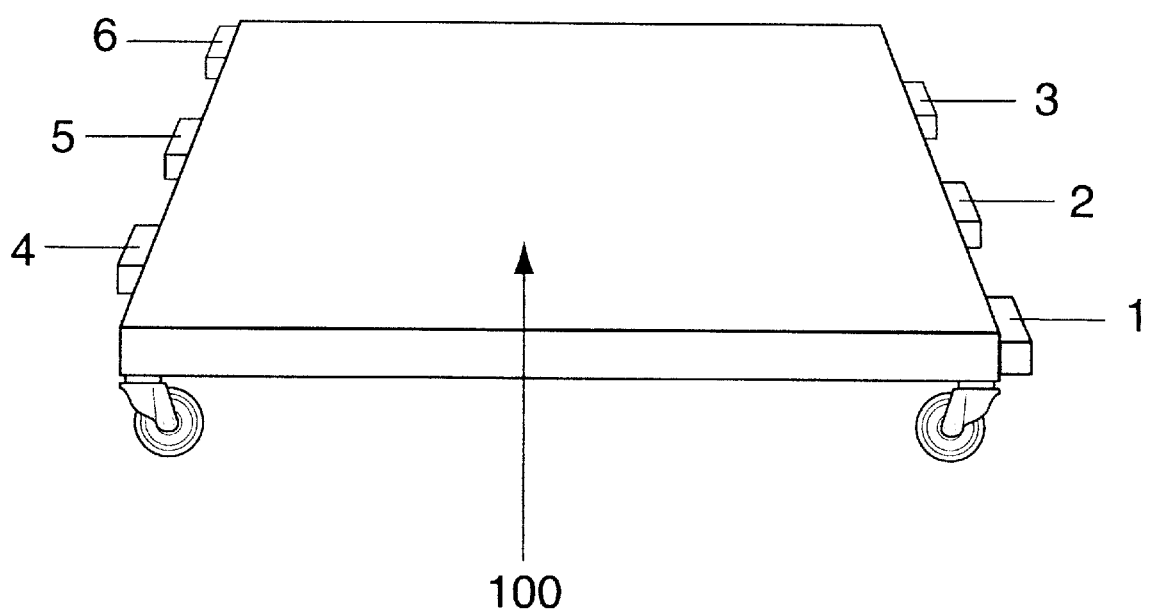
FIGS. 2 is a perspective view of the cart 100, shown in FIGS. 1A.

Front set of teeth 101 and rear set of teeth 201 are of identical construction, except that the location of the teeth are offset so that the front set of one cart can be intermeshed with the rear set of another cart. As shown in FIG. 2B, front tooth 1 fits into the space comprising surface 19 of rear set of teeth 201. Similarly, front teeth 2 and 3 fit into the spaces comprising surface 45 and 56 of rear set of teeth 201, respectively.

Figure 3A:
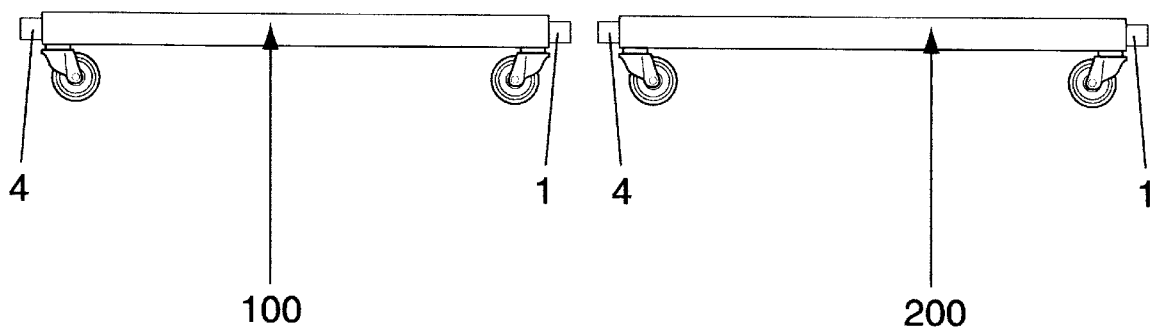
FIGS. 3A and in FIG. 3B are the same as FIGS. 1A and 1B, respectively, except that they are in front view.
Figure 3B:
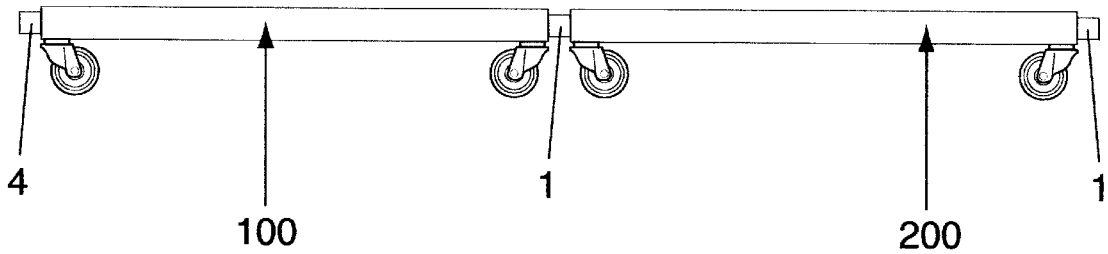

In FIG. 1A, surfaces 2a and 2b show the depth of front tooth 2. FIG. 3A shows the depth of front tooth 1. For all teeth, the depth and height are of sufficient dimension to keep two or more carts in alignment with each other when they are being pushed with their teeth in intermeshed position.

Figure 4:
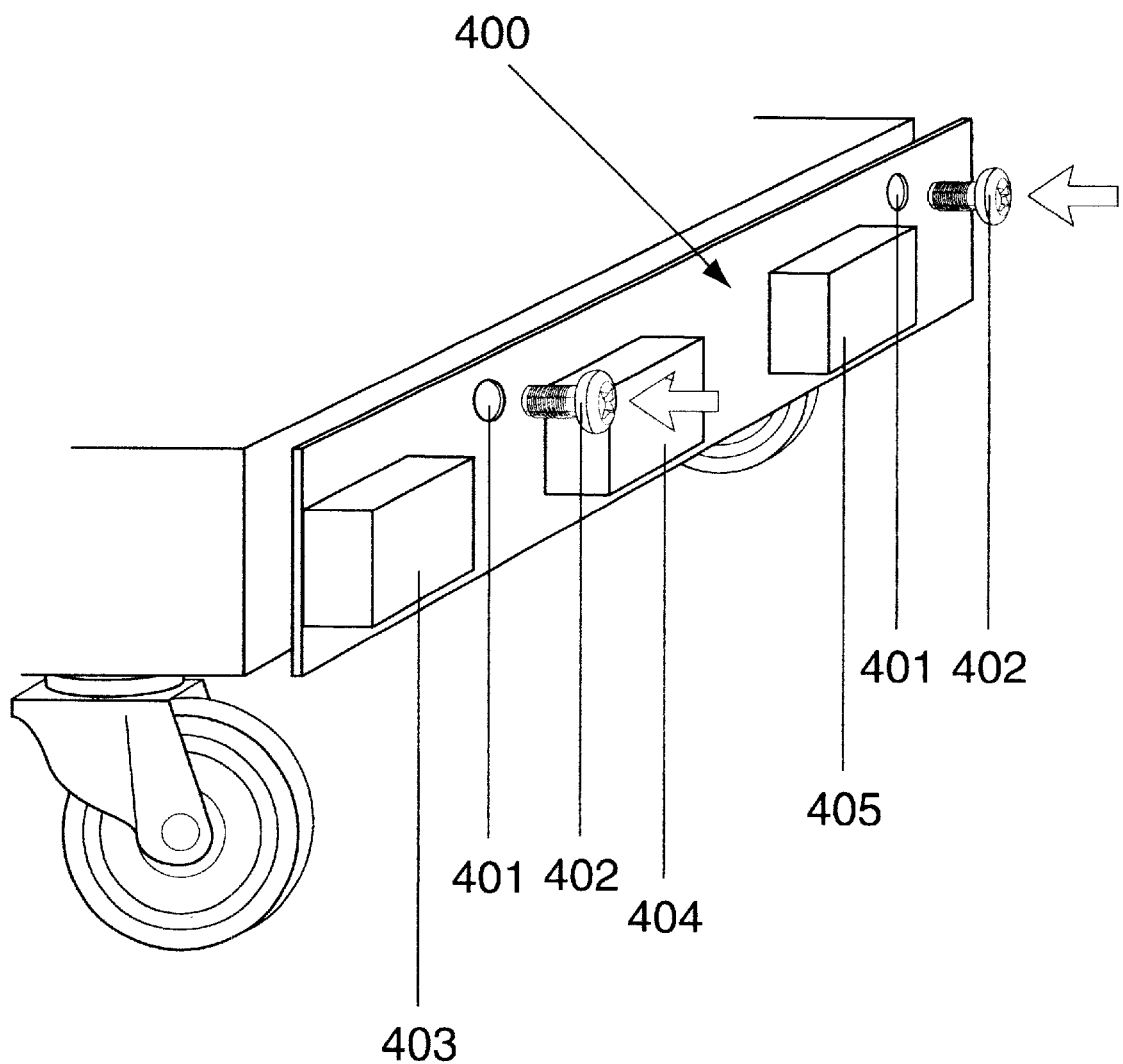
FIG. 4 is a perspective view, showing a set of teeth as a separate unit that can be attached to a cart.

FIG. 4 illustrates the concept that a set of teeth can be a separate unit that can be attached to a cart. Unit 400 comprises teeth 403, 404 and 405. It has a flat back surface that includes holes (401) through which screws (402) pass to attach the set of teeth to the cart. Also, the set of teeth could be attached to the cart by a variety of other means commonly used for such purposes.

DESCRIPTION OF AN ALTERNATIVE EMBODIMENT

Figure 5A:
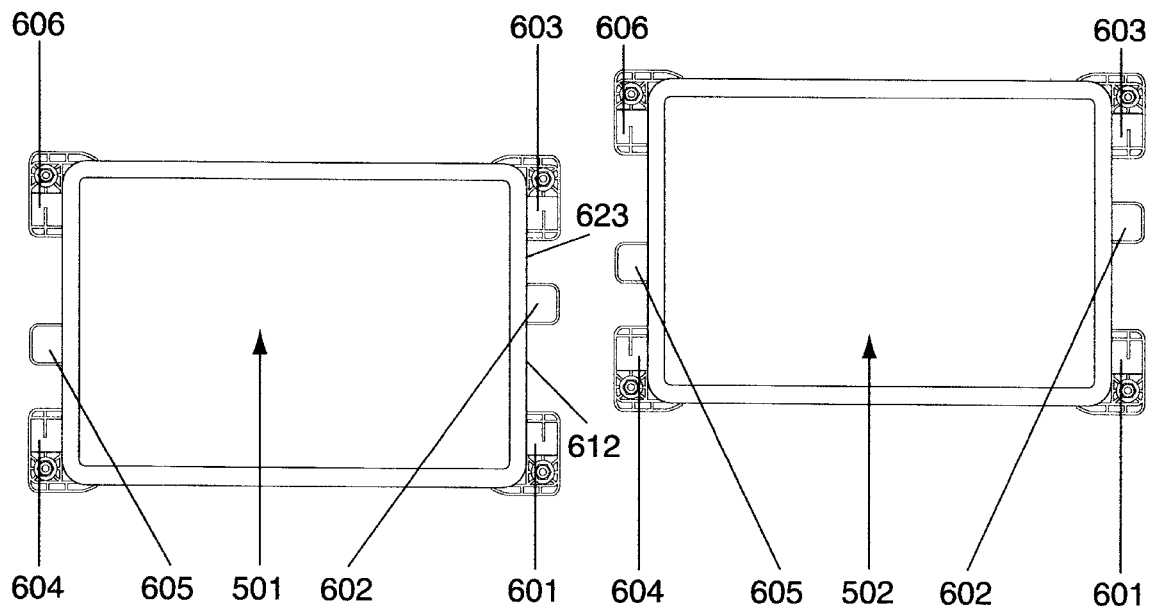
FIG. 5 is a top view of an alternative embodiment of the invention, showing sets of front and rear teeth that are not offset from each other, but that can be intermeshed by offsetting one cart from the other.
Figure 5B:
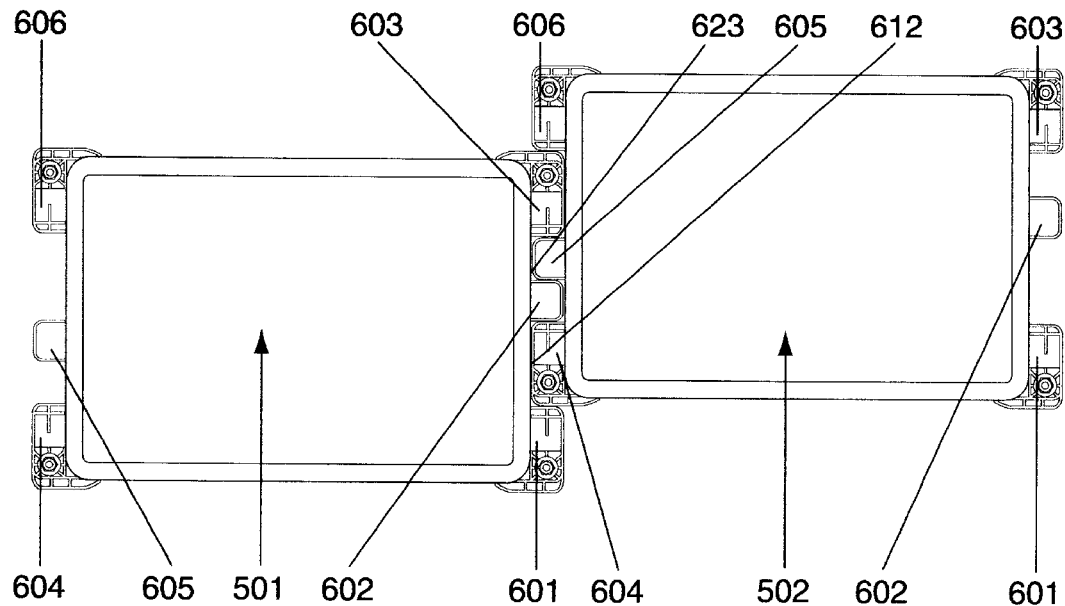

FIGS. 5A and 5B show a top view of an alternative embodiment of the present invention in which the front and rear teeth are not offset from each other, but rather the carts themselves are offset so that the teeth intermesh. FIG. 5A shows front teeth 601, 602 and 603, and rear teeth 604, 605 and 606. Front teeth 601 and 602 are separated by space 612, and front teeth 602 and 603 are separated by space 623. Cart 501 can be offset in relationship to cart 502, so that rear tooth 604 fits into space 612 and rear tooth 605 fits into space 623. FIG. 5A shows carts 501 and 502 before they have been intermeshed; FIG. 5B shows such carts after they have been intermeshed.

Those who are skilled in the art will readily perceive how to modify the invention. Therefore, the appended claims are to be construed to cover all equivalent structures which fall within the true scope and spirit of the invention.

We claim:

1. A hand-propelled, wheeled cart system comprising:
   at least a first and at least a second hand-propelled cart, each of the first and second carts having
       a wheeled cart body having a front end and a rear end;
       a first set of teeth projecting horizontally outward from the front end of each of the first and second carts, the teeth of the first set spaced apart from each other in a sawtooth configuration; and
       a second set of teeth projecting horizontally outward from the rear end of each of the first and second carts, the teeth of the second set spaced apart from each other in a sawtooth configuration and offset with respect to the first set of teeth such that the set of teeth on either end of the first cart is configured and adapted to releasably intermesh with the set of teeth on either end of the second cart;
   wherein either end of the first cart may be joined with either end of the second cart, without the aid of linking pins, when the set of teeth on either end of the first cart is pushed into and intermeshed with the set of teeth on either end of the second cart thereby preventing independent lateral motion of and maintaining alignment of the first and second carts and enabling the at least two carts to be pushed as a single unit.

2. The system of claim 1, wherein the first set of teeth is integral with each of the cart bodies.

3. The system of claim 1, wherein the first set of teeth is connected to each of the cart bodies using a mechanical fastener.

4. The system of claim 1, wherein the second set of teeth is integral with each of the cart bodies.

5. The system of claim 1, wherein the second set of teeth is connected to each of the cart bodies using a mechanical fastener.

6. The system of claim 1, wherein the first and second sets of teeth are formed from metal, plastic, rubber or wood.

7. A hand-propelled, wheeled cart system comprising:
   at least a first and at least a second hand-propelled cart, each of the first and second carts having
       a wheeled cart body having a front end and a rear end;
       a first set of teeth projecting horizontally outward from the front end of each of the first and second carts, the teeth of the first set spaced apart from each other in a sawtooth configuration; and
       a second set of teeth projecting horizontally outward from the rear end of each of the first and second carts, the teeth of the second set spaced apart from each other in a sawtooth configuration such that the set of teeth on either end of the first cart is configured and adapted to releasably intermesh with the set of teeth on either end of the second cart;
   wherein either end of the fir cart may be joined with either offset end of the second cart, without the aid of linking pins, when the set of teeth on either end of the first cart is pushed into and intermeshed with the set of teeth on either offset end of the second cart thereby preventing independent lateral motion of and maintaining alignment of the first and second carts and enabling the at least two carts to be pushed as a single unit.

8. The system of claim 7, wherein the first set of teeth is integral with each of the cart bodies.

9. The system of claim 7, wherein the first set of teeth is connected to each of the cart bodies using a mechanical fastener.

10. The system of claim 7, wherein the second set of teeth is integral with each of the cart bodies.

11. The system of claim 7, wherein the second set of teeth is connected to each of the cart bodies using a mechanical fastener.

12. The system of claim 7, wherein the first and second sets of teeth are formed from metal, plastic, rubber or wood.

* * * * *